US011947666B2

(12) United States Patent
Cohen

(10) Patent No.: US 11,947,666 B2
(45) Date of Patent: Apr. 2, 2024

(54) SYSTEMS AND METHODS FOR EXPLOIT PREVENTION AND MALICIOUS CODE NEUTRALIZATION USING NON-PREDICTABLE RESULTS FOR JAVASCRIPT-ENABLED APPLICATIONS

(71) Applicant: Seraphic Algorithms Ltd., Tel-Aviv (IL)

(72) Inventor: Avihay Cohen, Tel-Aviv (IL)

(73) Assignee: SERAPHIC ALGORITHMS LTD, Tel Aviv (IL)

( * ) Notice: Subject to any disclaimer, the term of this patent is extended or adjusted under 35 U.S.C. 154(b) by 0 days.

(21) Appl. No.: 18/053,038

(22) Filed: Nov. 7, 2022

(65) Prior Publication Data

US 2023/0083463 A1  Mar. 16, 2023

Related U.S. Application Data

(63) Continuation of application No. 17/575,139, filed on Jan. 13, 2022, now Pat. No. 11,507,658, which is a (Continued)

(51) Int. Cl.
*G06F 21/55* (2013.01)
*G06F 21/12* (2013.01)
(Continued)

(52) U.S. Cl.
CPC .......... *G06F 21/554* (2013.01); *G06F 21/128* (2013.01); *G06F 21/54* (2013.01);
(Continued)

(58) Field of Classification Search
CPC ...... G06F 21/554; G06F 21/128; G06F 21/54; G06F 9/45529; G06F 9/54; G06F 2221/033
See application file for complete search history.

(56) References Cited

U.S. PATENT DOCUMENTS 5,974,549 A  10/1999 Golan
8,353,767 B1  1/2013 Borst et al.
(Continued)

OTHER PUBLICATIONS

Nonfinal Office Action dated Apr. 6, 2022 for U.S. Appl. No. 17/575,286.
(Continued)

*Primary Examiner* — Tuan C Dao
(74) *Attorney, Agent, or Firm* — Finnegan, Henderson, Farabow, Garrett & Dunner LLP

(57) ABSTRACT

Systems, methods, and computer-readable media for cybersecurity are disclosed. The systems and methods may involve receiving, by an application capable of JavaScript execution, code for execution; executing, before execution of the received code, an intercepting code, wherein the intercepting code is configured to intercept at least one application programming interface (API) invocation by the received code; intercepting, by the intercepting code, an API invocation by the received code; determining that the intercepted API invocation results in a manipulation of a backing store object; and modifying an execution of the intercepted API invocation, wherein the modified execution results in at least one of: a non-predictable memory layout, a non-predictable memory behavior, or a non-predictable property of an object.

41 Claims, 13 Drawing Sheets

Related U.S. Application Data continuation of application No. PCT/IL2021/051062, filed on Aug. 31, 2021.

(60) Provisional application No. 63/072,581, filed on Aug. 31, 2020.

(51) Int. Cl.
  *G06F 21/54* (2013.01)
  *G06F 9/455* (2018.01)
  *G06F 9/54* (2006.01)

(52) U.S. Cl.
  CPC ............ *G06F 9/45529* (2013.01); *G06F 9/54* (2013.01); *G06F 2221/033* (2013.01)

(56) References Cited

U.S. PATENT DOCUMENTS

| | | | |
|---|---|---|---|
| 9,253,013 B1 | 2/2016 | Kolam et al. | |
| 9,582,666 B1 | 2/2017 | Overson et al. | |
| 9,798,524 B1* | 10/2017 | Colton | G06F 16/972 |
| 9,898,537 B2* | 2/2018 | Leclerc | G06F 16/27 |
| 2002/0062346 A1 | 5/2002 | Chen | |
| 2004/0098715 A1* | 5/2004 | Aghera | G06F 8/65 |
| | | | 717/173 |
| 2004/0143564 A1* | 7/2004 | Gross | G06F 16/332 |
| 2006/0248310 A1* | 11/2006 | Kavalam | G06F 11/3476 |
| | | | 712/11 |
| 2008/0016339 A1 | 1/2008 | Shukla | |
| 2010/0262487 A1* | 10/2010 | Edwards | G06Q 30/02 |
| | | | 705/14.43 |
| 2012/0167121 A1* | 6/2012 | Reierson | G06F 9/468 |
| | | | 707/803 |
| 2013/0055266 A1* | 2/2013 | Gittelman | G06F 9/485 |
| | | | 718/100 |
| 2013/0212603 A1 | 8/2013 | Cooke et al. | |
| 2014/0245196 A1 | 8/2014 | Zheng et al. | |
| 2014/0282464 A1 | 9/2014 | El-Gillani | |
| 2014/0283067 A1* | 9/2014 | Call | G06F 21/54 |
| | | | 726/23 |
| 2015/0106426 A1* | 4/2015 | Antipa | H04L 67/1097 |
| | | | 709/203 |
| 2015/0304337 A1* | 10/2015 | Nguyen-Tuong | G06F 21/51 |
| | | | 726/1 |
| 2015/0319252 A1* | 11/2015 | Momchilov | H04L 67/01 |
| | | | 709/223 |
| 2016/0241560 A1* | 8/2016 | Reshadi | H04L 67/10 |
| 2016/0359901 A1 | 12/2016 | Yang | |
| 2017/0091428 A1 | 3/2017 | Johnson et al. | |
| 2017/0169100 A1* | 6/2017 | Reshadi | G06F 21/54 |
| 2017/0257385 A1 | 9/2017 | Overson et al. | |
| 2018/0157827 A1 | 6/2018 | Kang et al. | |
| 2018/0198807 A1* | 7/2018 | Johns | H04L 63/1425 |
| 2019/0342365 A1* | 11/2019 | Vysotsky | H04L 65/4015 |
| 2020/0409780 A1* | 12/2020 | Balasubramanian | G06F 9/547 |
| 2021/0097174 A1 | 4/2021 | Mandal | |
| 2021/0374241 A1 | 12/2021 | Parikh et al. | |

OTHER PUBLICATIONS

PCT International Search Report in counterpart Application No. PCT/IL2021/051062 dated Nov. 8, 2021 (3 pages).
PCT International Written Opinion in counterpart Application No. PCT/IL2021/051062 dated Nov. 8, 2021 (4 pages).
Extended Search Report for European Application No. 21860763.8 dated Feb. 2, 2024 (9 pages).
Marta Tasic, "Detecting Attacks using Program Alternatives," Jan. 6, 2015 (61 pages).

* cited by examiner

EXAMPLE MAPPING simpleArray[0] → decode(Inner_Object1[0])
simpleArray[1] → decode(Inner_Object2[1])
simpleArray[2] → decode(Inner_Object3[2])
simpleArray[3] → decode(Inner_Object1[1])
simpleArray[4] → decode(Inner_Object3[3])
simpleArray[5] → decode(Inner_Object1[3])
simpleArray[6] → decode(Inner_Object2[3])
simpleArray[7] → decode(Inner_Object2[2])

FIG. 4D

SYSTEMS AND METHODS FOR EXPLOIT PREVENTION AND MALICIOUS CODE NEUTRALIZATION USING NON-PREDICTABLE RESULTS FOR JAVASCRIPT-ENABLED APPLICATIONS

CROSS-REFERENCE TO RELATED APPLICATIONS

This application is a continuation of U.S. application Ser. No. 17/575,139, filed on Jan. 13, 2022, which issued as U.S. Pat. No. 11,507,658 on Nov. 22, 2022, which is a continuation of International Application No. PCT/IL2021/051062, filed on Aug. 31, 2021, which claims priority to U.S. Provisional Patent Application No. 63/072,581, filed on Aug. 31, 2020. The disclosures of the above-referenced applications are expressly incorporated herein by reference in their entireties.

FIELD OF THE INVENTION

The invention relates to the field of cyber defense, and more specifically to browser and other JavaScript enabled applications exploit prevention and malicious code neutralization

BACKGROUND

Typically, cyber-attackers employ unknown advanced malware and zero-day vulnerabilities exploits. Most existing cyber defense technologies rely heavily on signature-based detection for known threats, or signatureless technologies, such as static Indicators of Compromise (IOCs) tactics or dynamic approaches such as machine learning-enabled behavioral and anomaly analytics, sandboxing, and deception. Even more advanced solutions are enabled by different Moving Target Defense (MTD) tactics.

However, most current cyber defense techniques practically fail to prevent, protect or even detect and remediate most of the advanced threats, as malicious players employ state-of-the-art evasive techniques, and keep a step ahead in this cat and mouse game.

Furthermore, in the last few years, browsers, JavaScript engines, and other applications using JavaScript (e.g., Facebook, WhatsApp, etc.) have become much more sophisticated, and this segment is expected to grow even further, as web applications become more and more common. Increasing levels of sophistication of applications require additional code to implement each new feature, which in turn increases the number of potential vulnerabilities and risk of malicious attacks.

Of the common JavaScript applications, web browsers are the most common attack targets. Known solutions for browser exploits exist at the operating system (OS) level, and thus must monitor browser processes from the OS level in order to detect malicious behavior. This approach has a significant flaw, as the ability to monitor and understand the high-level JavaScript logic of the browser, from a lower level, is limited. In addition, restricted devices, such as smart TVs, smartphones, and the like, cannot run those OS-level solutions, which further increases the prevalence of the browser as an attack vector. Accordingly, implementation of a cyber-defense solution at the JavaScript application level is of significant value.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a system comprising at least one hardware processor; and a non-transitory computer-readable storage medium having stored thereon program instructions, the program instructions executable by the at least one hardware processor to: receive, by an application capable of JavaScript execution, a code for execution, inject, before the execution, an intercepting code into the received code, wherein the intercepting code is configured to intercept all application programming interface (API) invocations by the received code, intercept, by the intercepting code, an API invocation by the received code, determine that the intercepted API invocation, and results in a manipulation of a backing store object, and modify an execution of the intercepted API invocation, wherein the modified execution results in a non-predictable memory layout.

There is also provided, in an embodiment, a computer-implemented method comprising: receiving, by an application capable of JavaScript execution, a code for execution; injecting, before the execution, an intercepting code into the received code, wherein the intercepting code is configured to intercept all application programming interface (API) invocations by the received code; intercepting, by the intercepting code, an API invocation by the received code; determining that the intercepted API invocation, and results in a manipulation of a backing store object; and modifying an execution of the intercepted API invocation, wherein the modified execution results in a non-predictable memory layout.

There is further provided, in an embodiment, a computer program product comprising a non-transitory computer-readable storage medium having program instructions embodied therewith, the program instructions executable by at least one hardware processor to: receive, by an application capable of JavaScript execution, a code for execution, inject, before the execution, an intercepting code into the received code, wherein the intercepting code is configured to intercept all application programming interface (API) invocations by the received code, intercept, by the intercepting code, an API invocation by the received code, determine that the intercepted API invocation, and results in a manipulation of a backing store object, and modify an execution of the intercepted API invocation, wherein the modified execution results in a non-predictable memory layout.

In some embodiments, the program instructions are further executable to store a mapping of the modified execution, and use the mapping to respond to read or write operations by the intercepted API. In some embodiments, the method further comprises storing a mapping of the modified execution, and using the mapping to respond to read or write operations by the intercepted API In some embodiments, the injecting is performed by at least one of: a proxy server, a browser extension, and a privileged operating system agent.

In some embodiments, the application is a web browser, and the received code is a webpage.

In some embodiments, the modifying comprises at least one of: (i) encoding at least some randomly selected arguments in input data associated with the API invocation; (ii) dividing the input data into a random number of execution contexts; (iii) splitting the input data into a random number of subsets of the input data; (iv) padding at least some randomly selected arguments in the input data with random data of the same type; (v) adding a random number of inline properties to the input data, wherein the properties are as non-enumerable with a Symbol as the property key: (vi) allocating a random number of additional backing store objects.

In some embodiments, the at least some of the execution contexts are inline frames.

In some embodiments, the intercepted API invocation comprises creating a new JavaScript object, and wherein the dividing comprises: (i) splitting the input data into a random number of subsets of the input data; and (ii) creating, for each of the subsets, a separate the object within one of the different execution contexts.

In some embodiments, the intercepted API invocation comprises creating a new array object, wherein the input data comprises arguments associated with the array object, and wherein the dividing comprises: (i) splitting the input data into a random number of subsets of the input data; and (ii) creating, for each of the subsets, a separate array object within one of the different execution context.

In some embodiments, the mapping includes a location of each of the arguments within the different execution contexts.

In some embodiments, the intercepting comprises intercepting API invocations from all available execution contexts associated with the execution.

In some embodiments, the mapping comprises a reference to a location of each of the objects, and wherein the reference is freed upon the occurrence of a specified condition.

In some embodiments, the responding is performed by a proxy object.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 4A-4D are a flowchart illustrating a method for chaotic manipulation of input data in the case of JavaScript object creation, in accordance with some embodiments of the present disclosure;

DETAILED DESCRIPTION OF THE INVENTION

Figure 1:
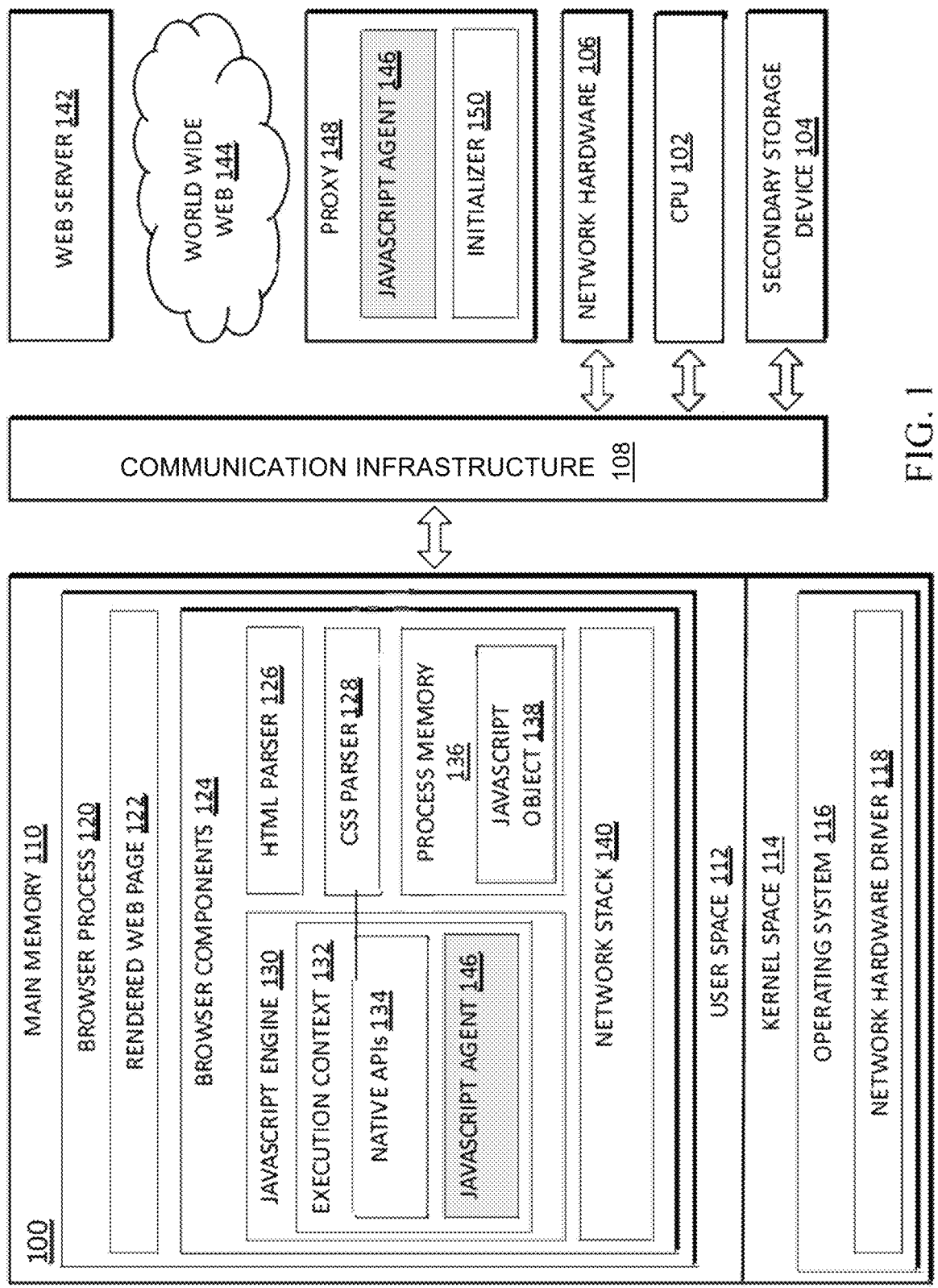
FIG. 1 depicts components of a computer system and browser environment, in accordance with some embodiments of the present disclosure.

Disclosed herein is a technique, embodied in a system, method, and computer program product, for automated neutralizing of malicious code in a computer system. In some embodiments, the present disclosure provides for various approaches for exploit prevention and malicious code neutralization.

Typically, a malicious code, trying to exploit some sort of vulnerability in the browser, first needs to trigger the vulnerability, and then construct the necessary artifacts for successful exploitation, which in most cases is reflected in achieving code execution.

Typically, browser vulnerability exploitations—and especially those attempting to circumvent exploit mitigation techniques, such as address space layout randomization (ASLR) and/or data execution prevention (DEP)—require carefully constructed payloads, both for vulnerability triggering and for further exploitation. The most common artifact employed by browser exploits is the use of JavaScript (JS) typed array objects. The exploitation process thus depends heavily on the predictable behavior of application programming interfaces (APIs). For example, a given exploit may create an array to hold its shellcode payload pending execution. Under normal conditions, the array creation process results in predictable behavior, which means that the created array will hold its corresponding backstage JsArray object with a predictable offset between its nodes, or with predictable properties such as array length and/or type.

Accordingly, in some embodiments, the present disclosure provides for manipulating API invocations of the JavaScript engine, in JavaScript enabled applications, so that the effect of the original API calls on the underlying memory layout will be unpredictable. As an exemplary result, the present technique will cause an object created by malicious code to reside in unpredictable memory locations, within multiple execution contexts; have varying random properties, such as length and/or random node ordering, and/or other inline properties, such as random strings, random interrupts, INT3 instructions, and the like. In some embodiments, the present technique may provide for additional manipulations of the code, e.g., padding and/or encoding of the payload.

It is noted that the manipulated, or "chaotic" execution approach of the present disclosure applies to all executable code, legitimate and malicious alike. However, the chaotic execution prevents any malicious code that relies on the predictable behavior of API invocations from fulfilling its malicious intent. At the same time, because the present disclosure generates and stores a mapping between the original and manipulated, "chaotic," execution parameters, to enable the present technique to return the intended values of all read operations of the input code. Thus, the present disclosure enables legitimate code to execute as intended.

In some embodiments, in order for API invocations to be manipulated, all native APIs are patched to enable their interception. Manipulation is preferably performed only on invocations that are used to create and/or manipulate back store objects. Manipulation is preferably performed in a randomized "chaotic" manner, and a mapping is generated and stored between the original and manipulated object. This way, valid code may refer to the mapping to get the intended values for all read/write operations, while malicious code that cannot rely, due to the manipulation, on a predictable memory layout/stored payload data, is neutralized as almost any vulnerability will not be triggered and any malicious payload will not execute.

In particular, a method in computing device is described herein. The method includes injecting Java Script agent (JSA) to a code, prior to, or upon, its receipt by an application capable of JavaScript execution; patching of all exposed native APIs on the application; intercepting all native API calls invoked by any JavaScript code in the current execution context; manipulating those of the intercepted API calls that are used for back store allocation and/or manipulation of user-controlled input, in a chaotic randomized manner, so that the effect of the original API call on the underlying memory layout/stored data will be unpredictable; generating and storing a mapping between the original and manipulated parameters; and using the generated mapping to respond and return the intended values to read/write operations by the intercepted API calls, so that complete functionality for the high-level code is maintained, while any code that relies on a predictable behavior of the process memory layout fails to fulfill any malicious intent. In some embodiments, the present disclosure may further create a proxy object that is returned to the original invocation and use the mapping to respond and return the intended value to read operations by the intercepted API calls so that complete functionality for the high-level code is maintained.

In one embodiment of the present method, the injection of the JSA may be performed by any means, for example, using:

A proxy (on premise/off premise-cloud based);
browser extension;
privileged OS agent; or
as a package for a node.js project.

Figure 5A:
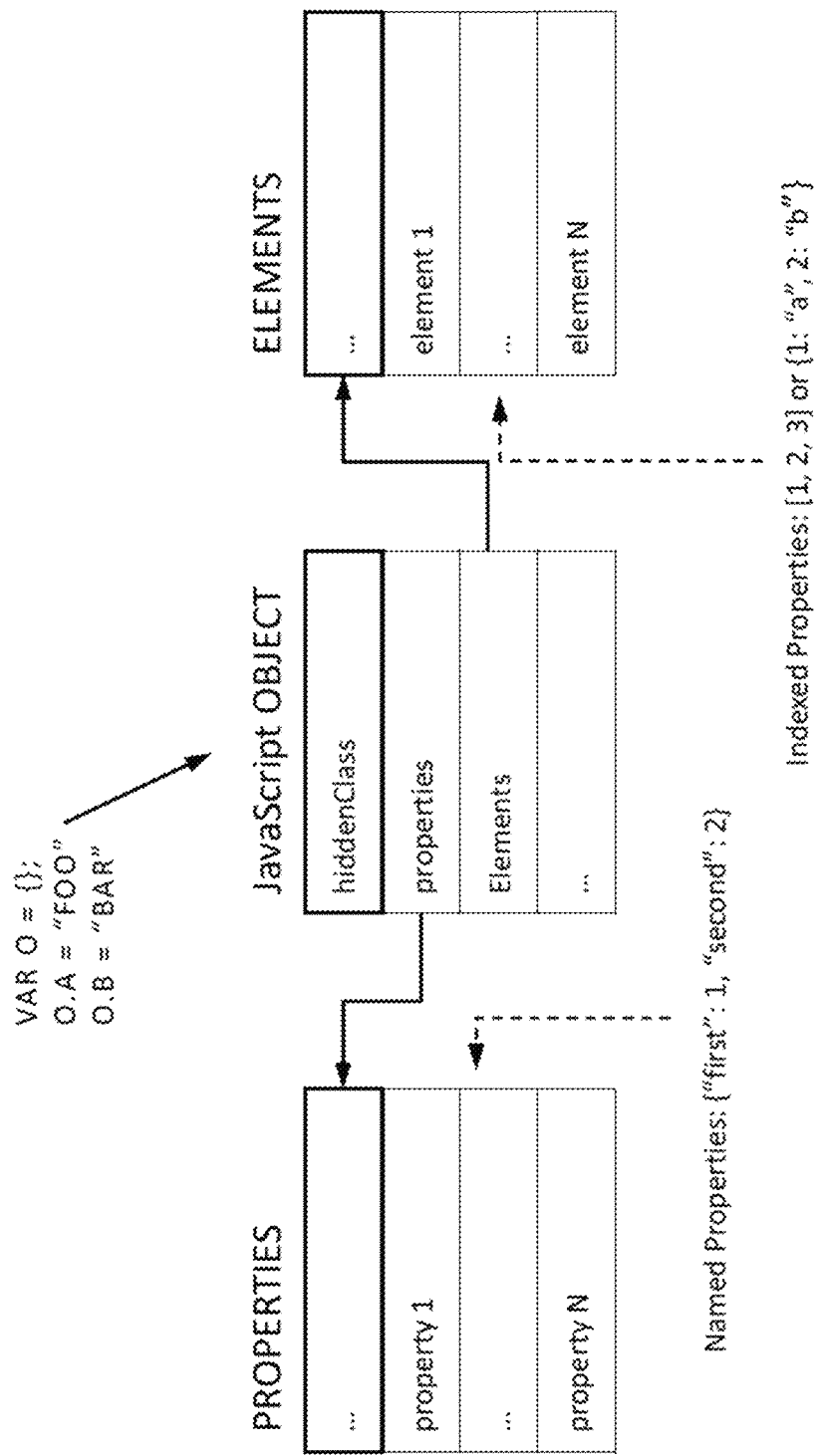
FIGS. 5A-5C show a process of adding inline properties to a JavaScript object, schematic depiction of a simple JavaScript object, in accordance with some embodiments of the present disclosure.
Figure 5B:
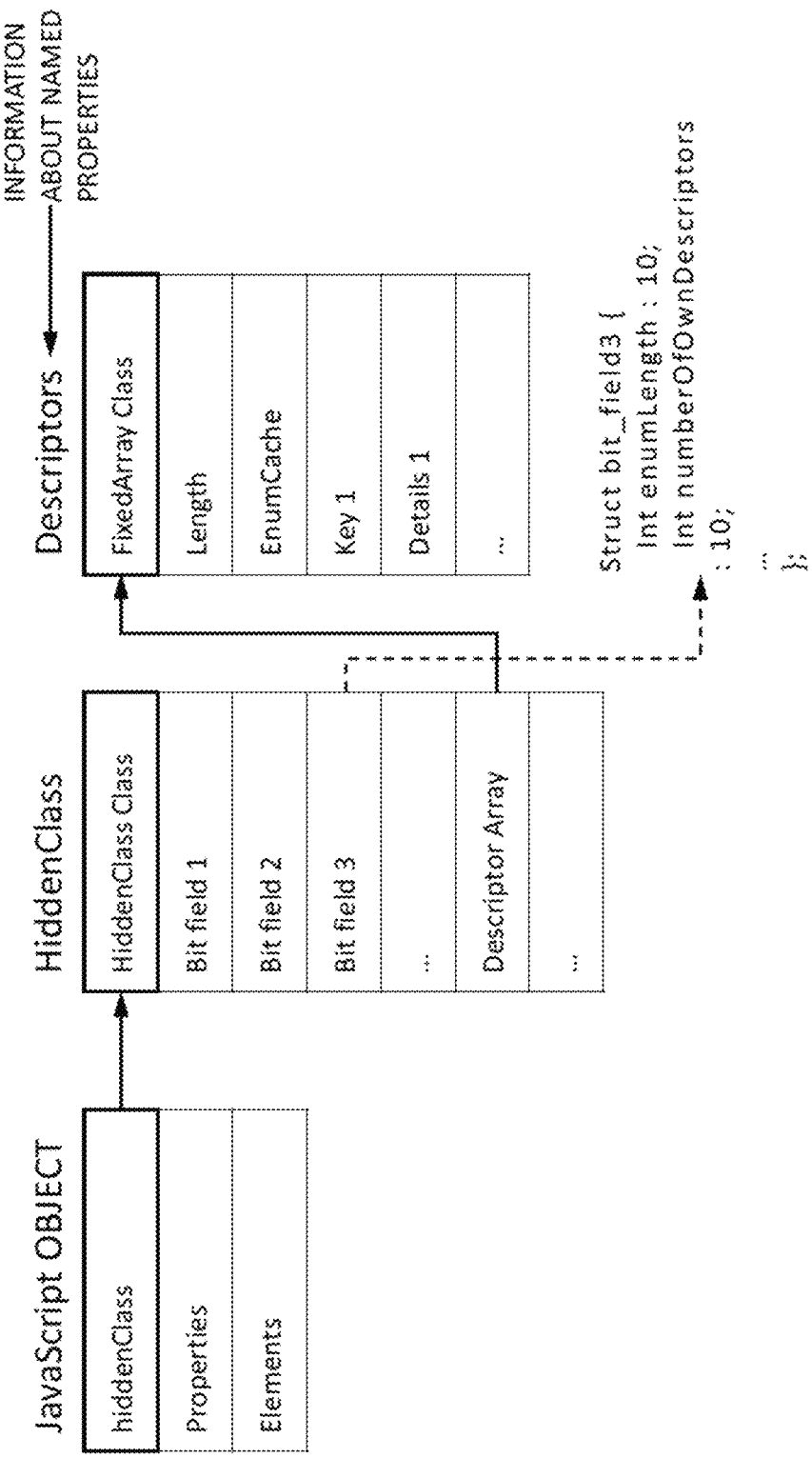
Figure 5C:
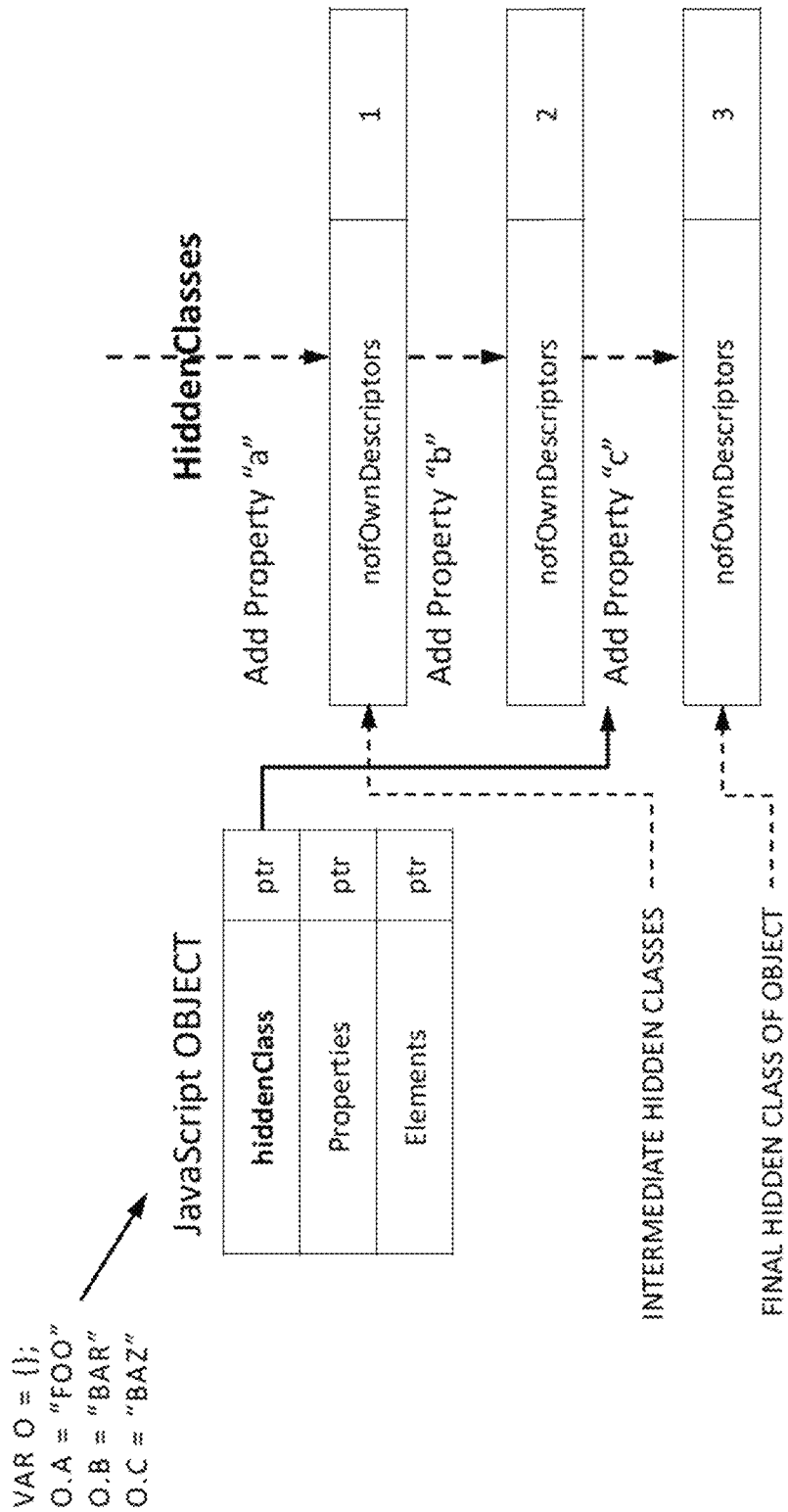
Figure 6A:
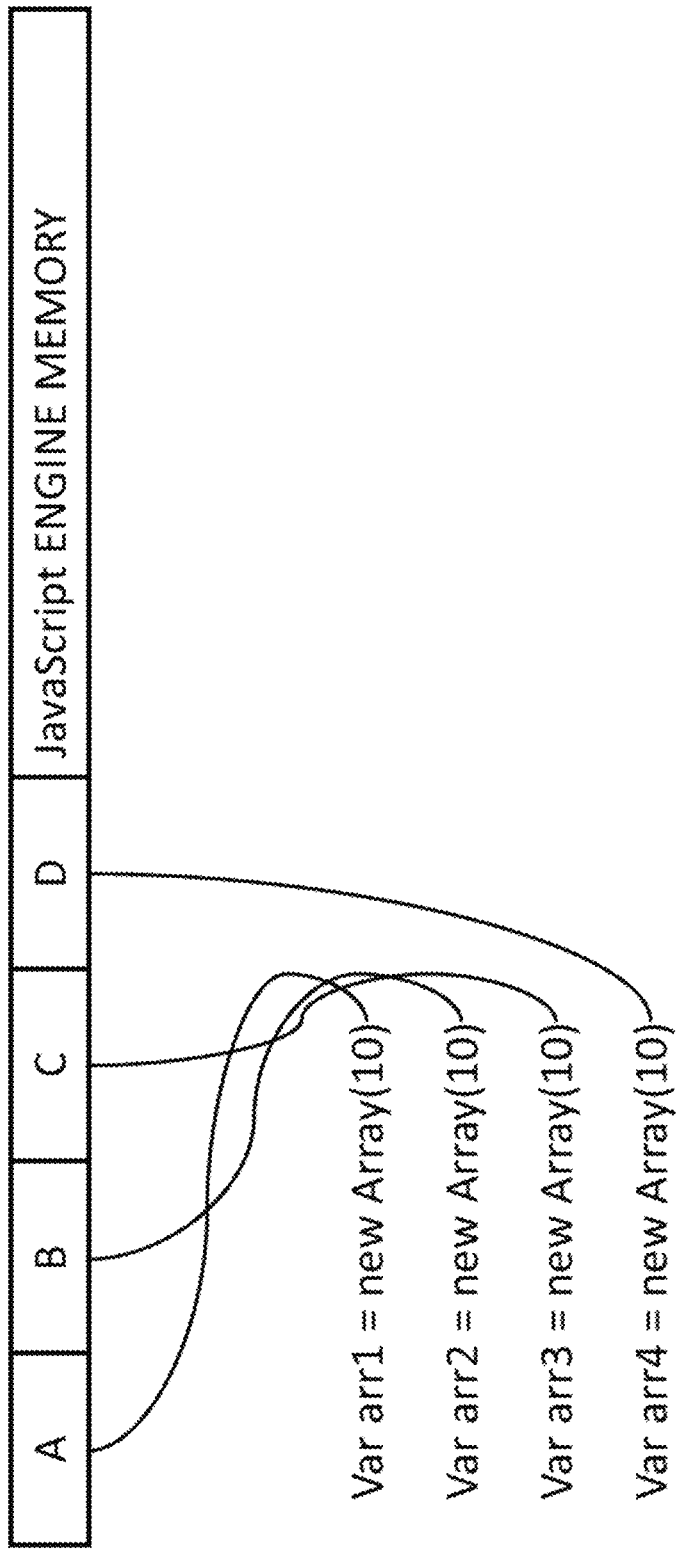
FIGS. 6A-6B schematically depict random memory allocation manipulation, in accordance with some embodiments of the present disclosure.
Figure 6B:
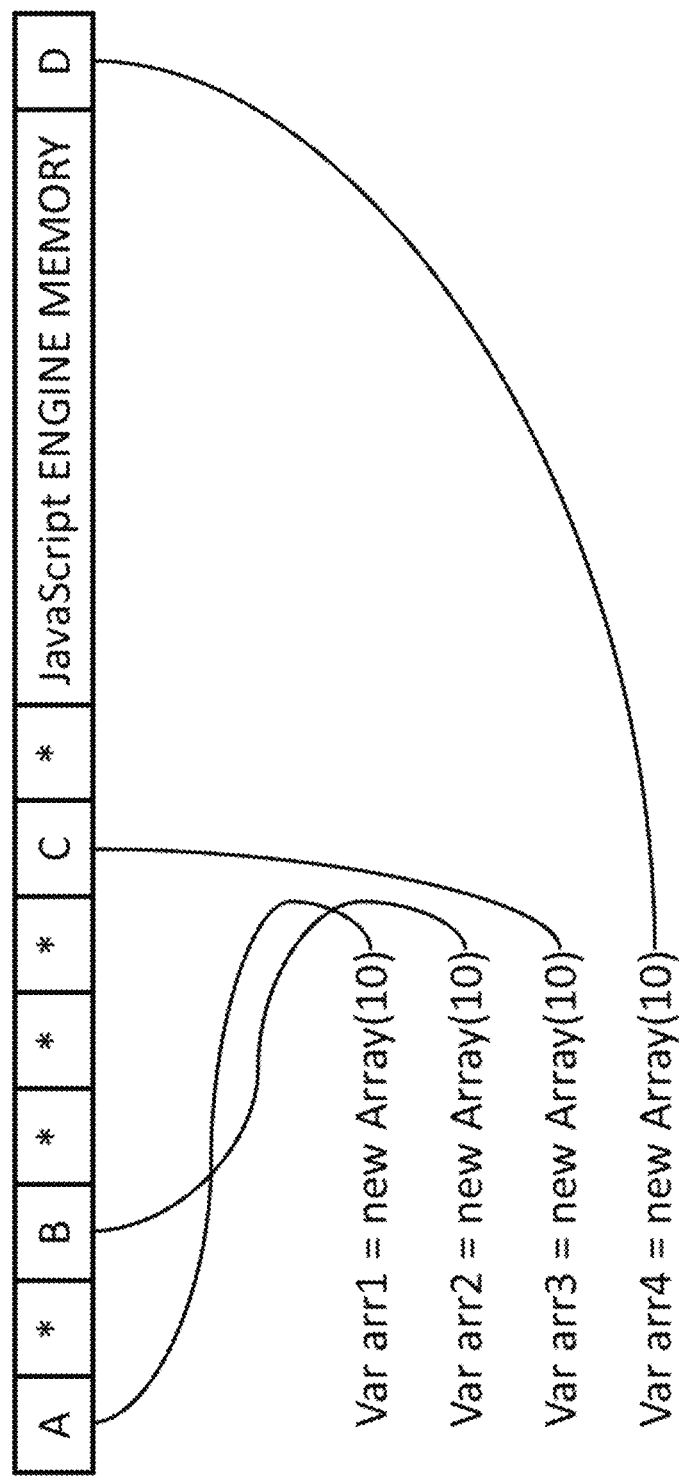

In one embodiment of the present disclosure, the application is a web browser and at least some of the received code is a web page. In one embodiment of the present disclosure, the manipulation of input data may include different methods, including any combination of one or more of the following actions:

Encoding at least some randomly-selected arguments in the input data;
dividing the input data into a random number of execution contexts (e.g., inline frames, objects, augmented execution);
splitting the input data into a random number of subsets of the input data; and/or
padding at least some randomly selected arguments in the input data with random data of the same type.
storing object references by the JSA, such that the reference to that object will not be freed and the garbage collector will not collect it.
adding inline properties to the created object, for example, adding a random number of properties containing primitive values, and set as non-enumerable with a Symbol as the property key. For example, object "o" may be defined with a random Symbol as a property key, and a value equal to some_primitive (e.g., 10101010). The object descriptor may be set to non-enumerable and non-configurable, which will result in the direct manipulation of the backing store object in a way that will create an unpredictable variant. FIGS. 5A-5B show a schematic depiction of a simple JavaScript object {a: "foo", b: "bar"}. This object has two named properties, "a" and "b," and two elements or array-indexed properties: 0, with the value "foo", and 1, with the value "bar." FIG. 5B schematically depicts the HiddenClasses and DescriptorArrays. The HiddenClass stores meta information about an object, including the number of properties on the object and a reference to the object's prototype. HiddenClasses are created on the fly and updated dynamically as objects change. HiddenClasses serve as an identifier for the shape of an object and as such a very important ingredient for V8's optimizing compiler and inline caches. FIG. 5C depicts the addition of a property to the JavaScript object (e.g., c: "baz"). Every time a new property is added, the object's HiddenClass is changed. A transition tree is created in the background, which links the HiddenClasses together.

randomly allocating new backing store objects in the memory, wherein each object contains a random number of properties and random length primitives, which result in a more robust "chaotic" memory allocation behavior for the underline JavaScript engine. For example, if a given code creates a new array object [new_Array(100)], JSA 146 will allocate, before the actual allocation of the target object, a random number of randomly-created objects. After memory allocation of the target object, the same will occur, such that the memory allocations behavior of the JavaScript engine becomes even more "chaotic." FIGS. 6A-6B schematically depict this random memory allocation manipulation. In FIG. 6A, during normal execution, the allocator behavior is predictable, which means that if the address for array "arr1" is known, it may be used to determine the addresses for other array objects arr2, arr3, arr4, etc. conversely, as can be seen in FIG. 6B, during random memory allocation, a random amount of our objects may be allocated, which will make the allocator behavior unpredictable. In some embodiments, JSA 146 may allocate a stack of multiple native objects and will be stored internally, such that later on, if a given code tries to allocate an object with the same type stored in the internal stack, this object may be returned instead of allocating a new object, which has the result of further making the allocator behavior unpredictable.

In one embodiment, at least some of the execution contexts are inline frames. In one embodiment of the present disclosure, intercepting API calls includes creating a new JavaScript object, and the manipulation comprises:

Splitting and rearranging arguments into random subsets of arguments; and
creating, for each of the subsets, a separate object within one of the different execution contexts.

In one embodiment of the present disclosure, intercepting an API call includes generating a new array object, wherein the input data includes arguments associated with the array object, and wherein the manipulation includes:

Splitting and rearranging the arguments into random subsets of arguments; and
generating, for each of the subsets, a separate array object within one of the different execution contexts.

In one embodiment of the present disclosure, the mapping includes a location of each of the arguments within the different execution contexts. In one embodiment of the present disclosure, intercepting API calls includes intercepting API invocations from all available execution contexts associated with the execution. In one embodiment of the present disclosure, the mapping includes a reference to a location of each of the objects, wherein the reference is freed in a completely random manner based our a unique seed upon the occurrence of a specified condition.

As indicated above, JavaScript exploits follow certain common patterns. The exploit writer typically attempts to build abstract primitives which grant freedom in corrupting memory, e.g., by gaining out-of-bounds (OOB) memory access and/or allowing to read or write data at the process memory address space. However, by creating a chaotic execution environment, the present method thwarts this ability, and the intended purpose of the malicious code cannot be effected. Specifically, because most if not all of these exploits rely on generating objects (e.g., arrays), storing raw byte code in memory, and/or freeing objects under specific conditions, by executing the API invocations in a chaotic and unpredictable manner, an attacker cannot rely on the results of the generated objects, and thus cannot carry out the attack as intended.

For example, in the case of a JavaScript typed array allocation using a relevant JavaScript API (an action that almost all browser exploits use when exploiting memory corruption), an attacker may rely on the layout of the allocated object for successful exploitation. Thus, in order to create a chaotic execution environment using the browser API, embodiments of the present disclosure provide for creating multiple execution contexts (e.g., via multiple inline frame objects), in a way that causes the browser to allocate multiple memory sections for the multiple contexts. Thus, when the executed code invokes the relevant JavaScript API (e.g., an array constructor) to allocate a new array, the present software agent (JSA) intercepts the invocation, and splits all of the original invocation arguments randomly into multiple arrays corresponding to the multiple execution contexts. In some embodiments, each argument may also be processed by, e.g., data padding, encoding, and/or otherwise. In one embodiment of the present disclosure, in the case of a malicious exploit code trying to allocate an array to hold its shellcode for further exploitation, the shellcode ends up residing in memory scattered across multiple different execution contexts while also being encoded with a random key, and thus prevented from executing its intended.

In another embodiment of the present disclosure, the method may prevent malicious code attempts to perform a buffer-overflow attack. Buffer overflow attacks occur when an attacker provides malformed input to a program that causes it to write the input incorrectly, to areas outside the allotted memory location. Direct overflow attacks try to overwrite the return pointer on the stack, and indirect attacks try to overwrite a function pointer on the heap that is later dereferenced. In this regard, JavaScript has a built-in "garbage collector" which controls all memory management. Thus, many browser vulnerabilities involve garbage collector memory management (e.g., use-after-free exploits). For example, a malicious code may try to exploit a use-after-free vulnerability in an Orinoco garbage collector for Chrome, by creating a special object that will be freed under special conditions by the garbage collector, and later accessed by the malicious code to trigger the vulnerability. Using the present method, this scenario will be impossible to execute, because each API trying to create any object is intercepted and executed in a chaotic manner, with the reference held by the present software agent mapping function. Thus, the malicious code would not be able to trigger the vulnerability, because the reference to that object will still be held rather than freed, and the garbage collector will not collect it.

In some embodiment of the present disclosure, it is performed in real time with no disruption or impact on performance and with no or minimal latency in the execution of the code and/or any program executing on the computer system, and in a way that cannot be discovered by the attacker.

In some embodiments of the present disclosure, it does not require malicious code detection in order to operate, and is performed without regard to whether the content received may be suspicious or not, and without the need for applying malware detection algorithms.

In one embodiment of the present disclosure, it is useful for restricted devices, due to the fact that it operates on the application level without the need to gain access to the OS.

Malicious code or malicious content, as these terms are used throughout this disclosure, refers to any content, code, or computer program instructions intended for a malicious purpose, such as exploit code. Malicious code may be configured to perform any surreptitious or malicious task, in a way unwanted and unknown to a user, including, for example, taking control of a computer, obtaining data from a computer, and the like.

In some embodiments, the disclosed methods may be implemented with respect to any content included in a file or any other received content, without regard to whether the content itself is deemed suspicious in advance of the present method being performed.

In some embodiments, however, one or more malware detection techniques may be implemented together with the exemplary embodiments in association with receiving received content and generating modified received content, but knowledge or awareness of suspected malicious or suspicious content is not required to disarm any malicious content that may be included in the received content.

Received content according to the disclosed embodiments may include any form of electronic content, including any file or other objects that may be downloaded, run, processed, opened, or executed by an application or operating system of the victim computer or computing device. Malicious content may be embedded among seemingly legitimate content. A file according to the disclosed embodiments may include any file or file-like content, such as an embedded object or script, that is processed, run, opened or executed by an application of a computing system. In some embodiments, the present disclosure provides a chaotic execution environment generating engine configured to run within a Java Script environment.

A system is also described herein, configured to employ the method described herein. The system includes one or more processing units and a memory coupled with one or more processing units. The memory stores program code for execution by one or more processing units. The program code includes a JavaScript agent, including several modules: a patcher configured to patch all exposed native APIs of current execution context, and a controller configured to intercept all API invocation of the wrapped APIs, and to further identify API invocations that are used for backing store allocation and/or manipulations of user-controlled input, and further refer these API invocation to a chaotic engine configured to manipulate the altering invocations—splitting and rearranging in few subsets, encoding, identifying the type of arguments, padding and diverting the manipulated invocation to multiple different contexts.

The controller is further configured to store a mapping between the original and manipulated object and to generate values to be returned to the original invocation, using the mapping, so that complete functionality for the high-level code is maintained; while any code that relies on a predictable behavior of the process memory layout, fails to fulfill any malicious intent. A computer program product including a non-transitory computer-readable storage medium having program code embodied therewith, the program code executable by at least one hardware processor to perform the method described herein. Example Systems and Methods for exploit prevention and neutralizing malicious code FIG. 1 depicts components of a computer system 100, in accordance with some embodiments, that prevent exploitations and neutralizes the execution of malicious code associated with a computing process executing thereon.

Computer system 100 includes at least one hardware processor 102, at least one secondary storage device 104, network hardware 106, main memory 110, and communication infrastructure 108 interconnecting all the above.

System 100 may store in a non-volatile memory thereof, such as main memory 110 or another storage device, program instructions or components configured to operate hardware processor 102. In some embodiments, the software components may include an operating system, including various software components and/or drivers for controlling and managing general system tasks (e.g., memory management, storage device control, power management, etc.) and facilitating communication between various hardware and software components. The program instructions may include one or more software modules, such as JavaScript Agent (JSA) 146 and/or initializer 150.

Main memory 110 may be segmented into user space 112 and kernel space 114. Kernel space 114 may be reserved for storing and running operating system 116, and user space 112 may store and run application processes, such as browser process 120.

When a request is made by a browser for a web page, the request is transferred from the browser to the network stack 140, to network hardware driver 118, to network hardware 106, and the transferred to world-wide web 144, reaching target web server 142. The web page, including an external executable JavaScript code (input code), is received by the browser through network stack 140 and a browser process 120 initiated by the browser.

JavaScript engine 130 may then initiate an execution context 132. The web page is rendered 122, by different elements of the browser engine (e.g., HTML parser 126, CSS parser 128), and the JavaScript code is referred for execution by the JavaScript engine 130 (for example, V8 in chrome). The JavaScript Engine native APIs 134 may be invoked by a given input code with arguments for generation of a new Array. A native array constructor may be invoked, and creates a new array and fills it with the provided arguments in a predictable manner.

JavaScript engine 130 then generates the corresponding backing store array object (jsArray) 138 within process memory 136, and initializes it with the supplied arguments. As illustrated in FIG. 1, backing store array (jsArray) object 138 (more broadly referred to herein as a backing store object) is part of process memory 136, which is itself part of browser components 124, which is itself part of browser process 120.

The API invocation returns the newly-generated array object with the initialized arguments. This predictable behavior, which means that this array holds its corresponding backing store jsArray object 138, with a predictable offset between its nodes and/or predictable properties such as length and/or type, may enable a given exploit process to generate an array to hold its shellcode payload before execution, and thus carry out its malicious intent without any hindering.

To prevent such exploit process from executing as intended, embodiments described herein manipulate certain aspects of JavaScript engine 130 during run time.

For example, a received web page may be first encountered by initializer 150. Initializes 150, which may be configured to perform one of more of the following tasks:
Detect the current JavaScript environment (e.g., a browser, another application, a Node.js project, etc.);
detect the source of the current context,
prepare necessary artifacts, such as random internal nested execution contexts (iFrames),
start the DOM monitoring logic, and/or
initiate the JavaScript Agent (JSA) 146 context logic.

In some embodiments, the received code is then injected, upon or prior to its receipt by the browser, with a JavaScript Agent (JS) 146. Such interception and injection may be carried out by a proxy 148, connected to network 106. JSA 146 is injected at the top of the page received code, so that it is executed first by the Java Script engine. JSA 146 may be configured to identify and patch all native APIs exposed by the current execution environment, before any code is actually executed. Following the patching, JSA 146 may also be configured to intercept all API invocations and identify all API invocations associated with input data that may result in manipulation of a backing store object. JSA 146 may also be configured to further modify the altered APIs in a chaotic manner, so that the effect of API invocation on the memory layout will be unpredictable.

At the same time, JSA 146 may be configured to save the new arrangements to a mapping, and use the mapping to retrieve the original values. Thus, legitimate JavaScript code will work as intended, while any malicious code that relies on predictable behavior of process memory layout, fails to fulfil its malicious intent.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, etc. (not shown). Moreover, components of system 100 may be co-located or distributed, or the system may be configured to run as one or more cloud computing "instances," "containers," "virtual machines," or other types of encapsulated software applications, as known in the art.

Figure 2:
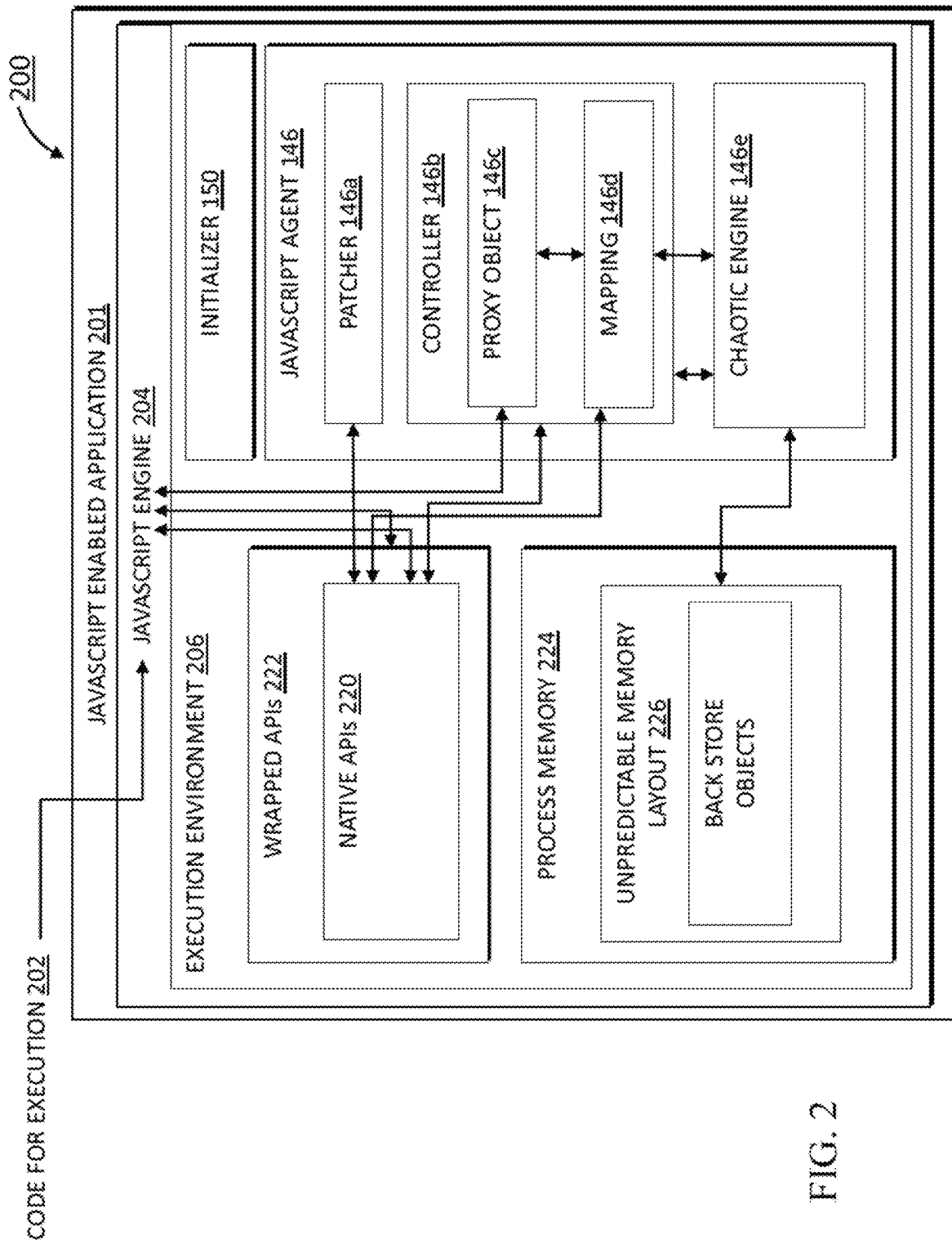
FIG. 2 is a block diagram of system for patching native APIs and intercepting and manipulating of patched APIs invocations, in accordance with some embodiments of the present disclosure.

FIG. 2 is a block diagram of an exemplary execution process 200 for patching of native APIs and interception and manipulation of patched API invocations, in accordance with some embodiments of the present disclosure. An application 201 capable of JavaScript execution receives code 202 for execution. Code 202 is directed to JavaScript Engine 204, for execution. Within execution environment 206, JavaScript Engine 204 first executes JavaScript agent (JSA) 146, which was injected to the top of the input code 202 (e.g., a received web page). Thus, in some embodiments, the received code 202 may be injected, upon or prior to its receipt by the browser, with JSA 146.

Such interception and injection may be carried out by a proxy 148, connected to network 106. Shown in FIG. 1. In some embodiments, JSA 146 is injected at the top of the page/received code 202, so that it is executed first by the JavaScript engine.

In some embodiments, JSA 146 may be configured to identify and patch all native APIs exposed by the current execution environment, before any code is actually executed. Thus, in some embodiments, a patcher 146a, which is a module of JSA 146, identifies and patches all exposed native APIs 220 in the current execution context, before any other code. Thus, from this point onward, all interactions between the received code and the native APIs are mediated by JSA 146, and any API invocation sees only the wrapped APIs 222. Thus, all API calls invoked by code 202 are intercepted by wrapped API 222 and referred to a controller 146b. In some embodiments, controller 146b will be invoked on each invocation of a native API, so as to replace it with the present wrapped API. Based on the invocation type, controller 146b may perform at least two of the following actions:

Serialize invocation parameters for telemetry,
invoke the execution control module, and/or
transfer control to chaotic engine 146e, to perform manipulations, as further detailed below.

In some embodiments, patcher 146a may be invoked for every execution context (e.g., iFrame) within the execution environment. Thus, for example, at first patcher 146a will be invoked within the "top" context, as well as within any other nested execution context.

In some embodiments, patcher 146a may be applied within the two following two main categories:

Regular native functions, which may also return a new object instance, and
Native constructor functions, which, when called using "new," will create a new object instance.

In some embodiments, patcher 146a is configured to be invoked for every execution context, including any "top" context as well as any other nested executing context therein. In some embodiments, when the "top" and any nested execution context are of the same source, patcher 146a patching module will patch the nested execution context window objects within the same JSA execution context, i.e., without the need for re-executing the JSA in the nested execution context. However, in cases where the nested execution context is from a different source, e.g., "cross origin," initializer 150 will re-inject the JSA in the nested execution context.

In some embodiments, patcher 146a will iterate on the vast majority of the native exposed APIs, and will replace the original native APIs with the present wrapped APIs, Wherein the wrapped APIs will invoke controller 146b on each invocation.

In some embodiments, patcher 146a may operate within two main categories:

Regular native functions, which may also return a new object instance, and/or
native constructor functions, which, when called using "new," will create a new object instance.

In some embodiments, the present disclosure provides for further manipulations to ensure that the present wrapped APIs may not be detected, while maintaining full functionality. Thus, for example, the present disclosure may provide for storing, with respect to each wrapped API, in a special key-value mapping 146d, the wrapped API as the key and the original native API as the value. This may facilitate the locating of the native API based on the wrapped API, and allow the present disclosure to return the expected values for operations on the wrapped API, as shall further be explained below. For example:

someFunc.toString( ) should return the string representation of a function, and in the case of a native function, it will return—"function Array( ) { [native code] }" (for Array native).
someFunclength indicates the number of parameters expected by the function.
someFunc.name—indicates the function name as specified when it was created.

All of these should return the expected value for each wrapped API, such that with respect to each invocation, the original native API may be retrieved via the mapping 146d and return the corresponding value for the native API, to be returned as the expected value. Thus, functionality transparency may be maintained for each of the wrapped APIs.

In some embodiments, following the patching, JSA 146 may also be configured to intercept all API invocations and identify all API invocations associated with input data that may result in manipulation of a backing store object. Thus, in some embodiments, controller 146b, which a module of JSA 146, diverts all API calls associated with input data that may result in manipulation of a backing store object, to a chaotic engine 146e, which manipulates the input data, and splits it into different contexts as it builds the backing store objects. This results in an unpredictable memory layout 226.

A mapping 146d of the manipulations applied to the API calls is generated and stored at controller 146b, which maps between the original and manipulated execution parameters. In some embodiments, a proxy object 146c is then created, which may be returned to the original code invocation, wherein the code sees the proxy-object as an array. All calls to indexes of this proxy object reach controller 146b, which returns the expected values to such read operations, by using mapping 146d. All attempts to add more nodes to the array again result in referring the call to the chaotic engine for manipulation.

Thus, complete functionality for the high-level code is maintained, as the proxy object returns the expected values for all read operations, while any code that relies on the predictable behavior of the underlying memory will fail due to the manipulations used by the process of generating the backing store objects.

Non-altering API invocations, e.g., API calls that are not used for back storing allocation and/or manipulation of user-controlled input, are documented and transferred by the controller 146b to the native API. In some embodiments, the controller 146b may be configured to block such API calls, based, e.g., on enterprise policy, and the like.

The program instructions of JSA 146, shown in FIGS. 1 and 2, including its modules patcher 146a, controller 146b, proxy object 146c, map 146d and chaotic engine 146e, will now be discussed with reference to the flowchart of FIG. 3, which illustrates the functional steps in a method for exploitations prevention and malicious process protection in a computer system, in accordance with some embodiments of the present disclosure.

Figure 3:
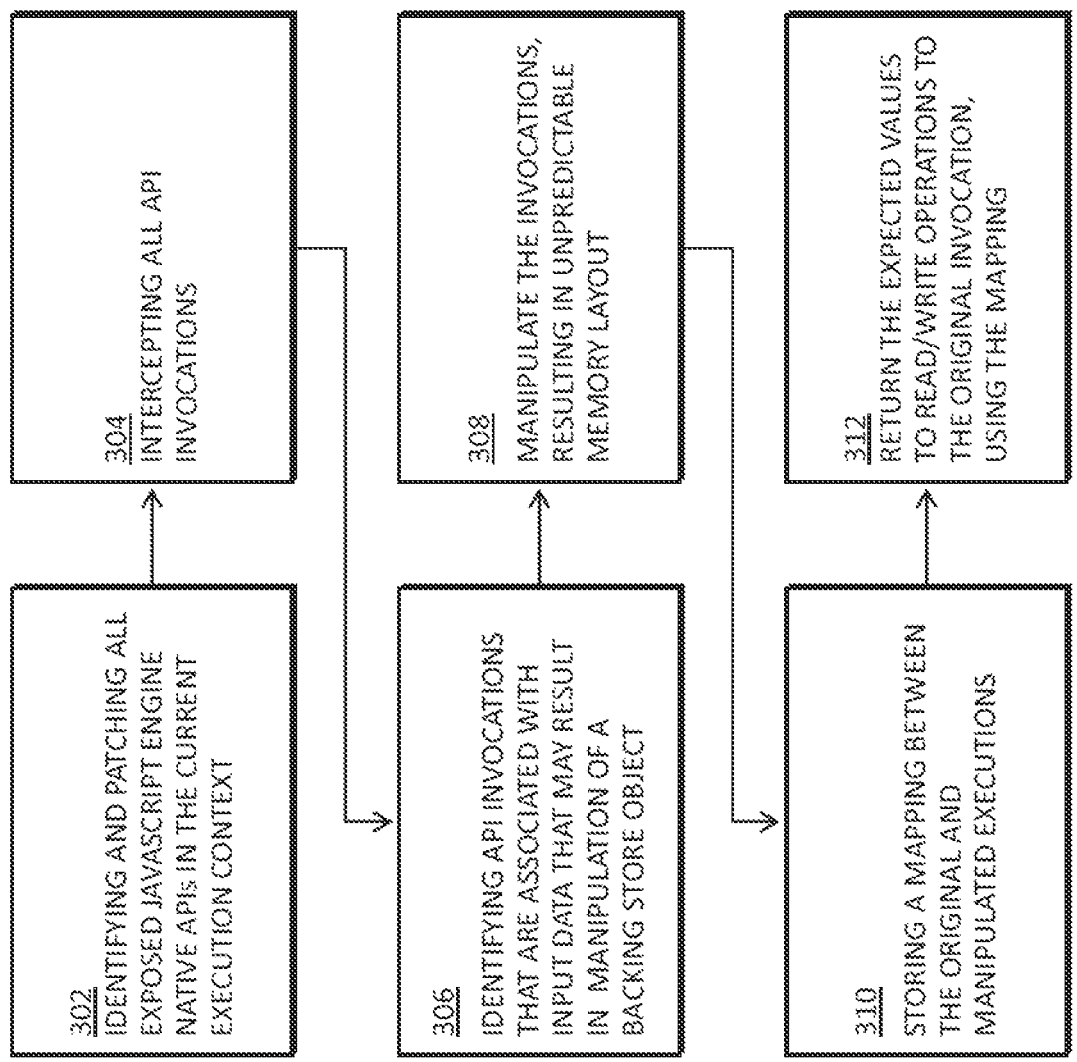
FIG. 3 depicts a flowchart of an example method for protecting a computer system from vulnerabilities exploitations/malicious processes, in accordance with some embodiments of the present disclosure.

For illustrative purposes, the flowchart in FIG. 3 is described with continued reference to system 100 in FIG. 1, and execution environment 200 in FIG. 2.

JavaScript Agent (JSA) 146, of FIGS. 1 and 2, respectively, may operate according to the flowchart in FIG. 3. The different modules of JSA 146 shown in FIG. 2, e.g., patcher 146a, controller 146b, proxy object 146c, map 146d and chaotic engine 146e, may operate according to the flowchart in FIG. 3. Wrapped APIs 222 and unpredictable memory layout 226, in FIG. 2, may operate according to the flowchart in FIG. 3.

In some embodiments, in step 302, a received code may be executed by application 201, e.g., a received webpage may be rendered in a browser.

In some embodiments, exposed native APIs in the current execution context are identified and patched. For example, with reference to FIG. 2, the program instruction of system 100 may cause patcher 146a, a module of JSA 146, to carry out identification and patching of exposed native APIs. At the conclusion of step 302, exposed native APIs 220 may become wrapped APIs 222, and are linked to controller 146b.

In some embodiments, in step 304, the program instruction of system 100 may cause controller 146b, a module of JSA 146, to intercept all API invocations, which are now patched to wrapped APIs 222.

In some embodiments, controller 146b may be configured to intercept each invocation of a native API, and to replace is with wrapped APIs 222.

For example, in FIG. 2, all invocations of wrapped APIs 222 are intercepted and referred to controller 146b. In some embodiments, controller 146b may be configured to intercept all API invocations. In some embodiments, controller 146b may be configured to intercept only API invocations which comprise input data or values, e.g., array arguments, from an untrusted source. In some embodiments, intercepted API invocations are only those comprising 'exposed' APIs, i.e., those which may result in a backing store allocation. In some embodiments, 'exposed' APIs may be detected by JSA 146 in real time, during execution. In some embodiments, exposed APIs may be detected based on a predetermined list of APIs. Examples of such APIs are any APIs which may be used for storing and/or manipulating input arguments from a third-party, which may include, but are not limited to, Array( ) constructor, Object constructors, typed arrays, Array Buffer, collections, Atomics, DataView, etc.

In some embodiments, in step 306, those of the intercepted API invocations that are associated with input data that may result in manipulation of a backing store object, are identified and referred for manipulation. For example, with reference to FIG. 2, the program instruction of system 100 may cause controller 146b to perform this process of identification.

In some embodiments, in step 308, the program instruction of system 100 may cause chaotic engine 146e, a module of JSA 146, to perform chaotic manipulation of a referred API invocation. In some embodiments, such manipulation comprises any combination of one or more of the following:

Splitting of arguments into subsets, and rearranging the split arguments in different argument subsets;
encoding input arguments or argument subsets with, e.g., a runtime generated key unique for each API invocation. In some cases, a different encryption key may be generated for each argument;
Inserting random padding of the same type as the argument in one or more of the arguments or argument subsets; and/or
diverting of manipulated data to multiple different execution contexts.

For example, with reference to FIG. 2, such manipulation may be performed by chaotic engine 146e, a module of JSA 146. In some embodiments, chaotic execution may comprise a random selection and/or combination of any of the above-listed actions, e.g., splitting, encoding, padding, and/or diverting into different execution contexts.

In some embodiments, all the above-mentioned manipulation methods may be performed in a random manner. For example, splitting arguments into subsets may be done randomly, whereas the number of subsets and their lengths selected by JSA 146, e.g., by chaotic engine 146e, at random. In another example, the above steps of splitting to argument subsets, padding, and diverting into different execution contexts may be performed by chaotic engine 146e.

This disclosure will discuss extensively the example of a chaotic execution of JavaScript array objects creation and their execution in a chaotic environment of the present disclosure. However, array objects are only one example of objects which may be created and/or utilized by API invocations and may result is backing store allocation. Other, additional, and/or similar JavaScript objects and their associated API invocation and/or other service calls may be similarly executed within a chaotic execution environment, and thus result in unpredictable and/or unknowable layout of the process memory.

Figure 4A:
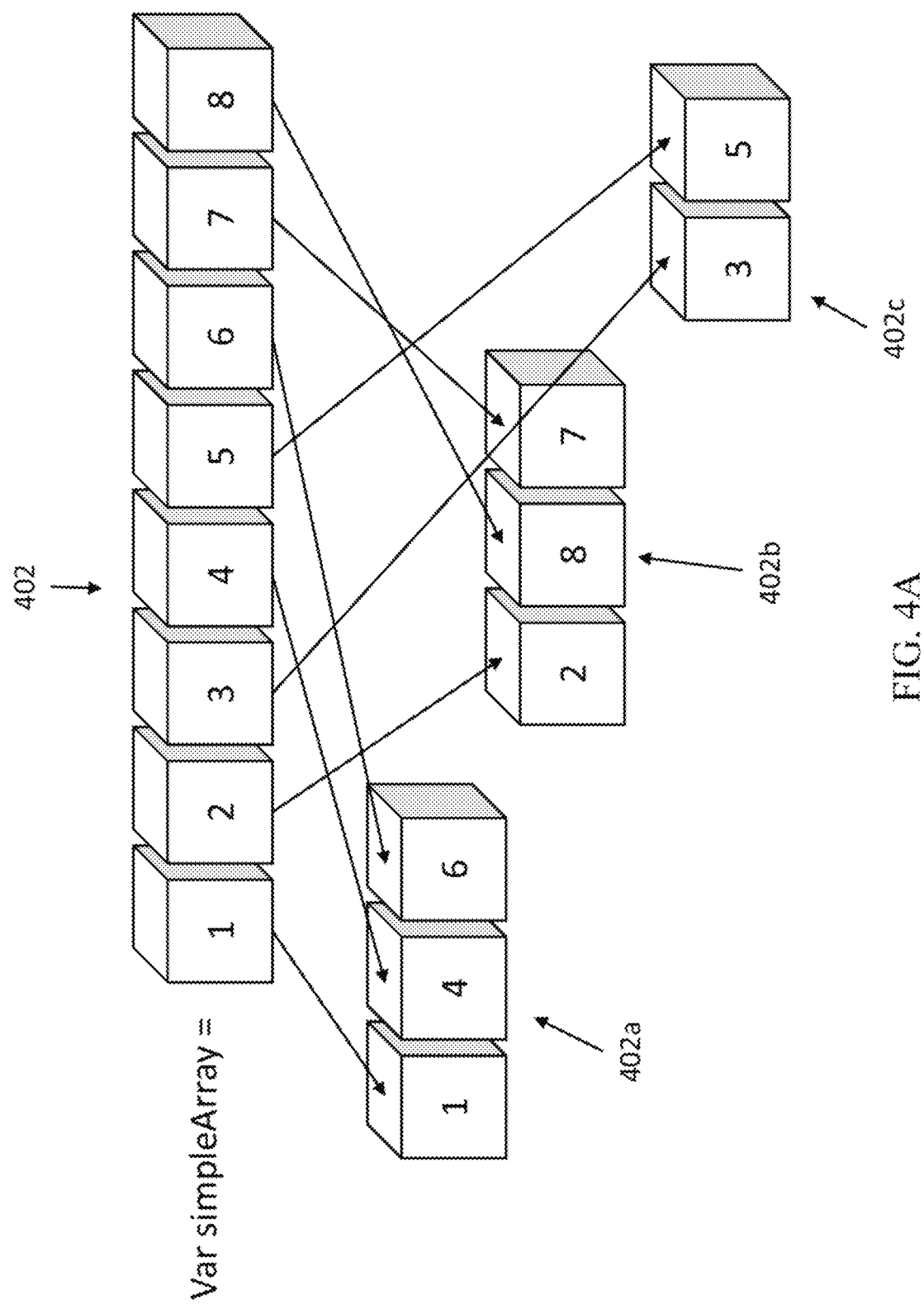

FIG. 4A is a schematic illustration of an object creation process, in this case, declaring a new variable using the declaration Var, and assigning to it an array 402 comprising the arguments 1, 2, 3, 4, 5, 6, 7, 8, using the simpleArray method. This formulation invokes the native JavaScript array creator API which will now attempt to create the array with the supplied arguments. The array creation typically results in a backing store allocation by the Java Script interpreter of memory addresses to store the created array.

In some embodiments, the input argument may be divided or split into a plurality of splits or subsets. In some embodiments, the number of splits may be randomly selected by JSA 146, e.g., by chaotic engine 146e. In some embodiments, the split in performed in a random and arbitrary manner, wherein the number of subsets and their length in selected by JSA 146 e.g., by chaotic engine 146e, at random.

As can be seen in FIG. 4A, the arguments are split into 3 subsets 402a-402c:
Subset 1: 1, 4, 6.
Subset 2: 2, 8, 7.
Subset 3: 3, 5.

Figure 4B:
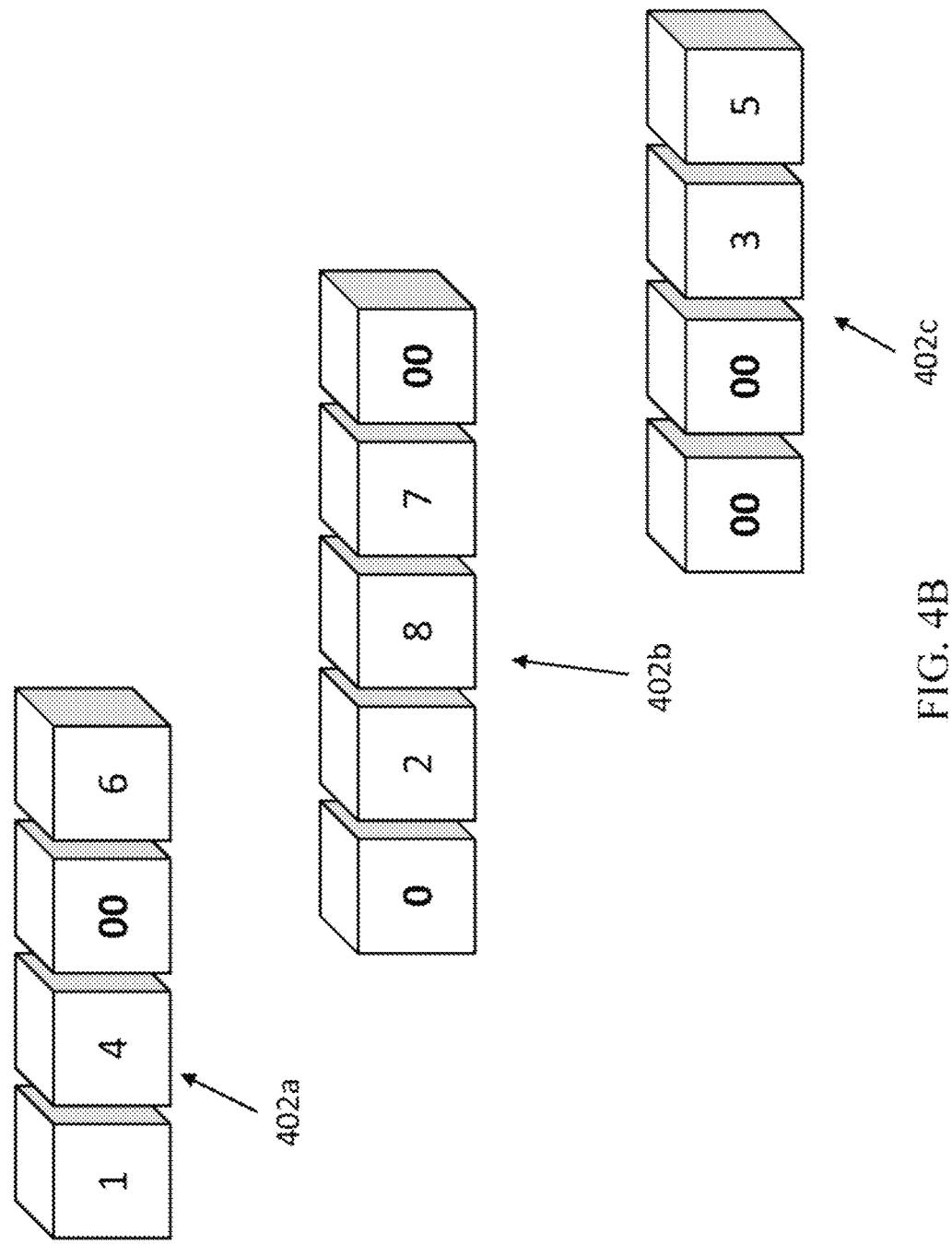

In some embodiments, JSA 146, e.g., chaotic engine 146e, may further perform one or more of the following with respect to one or more for the splits:

Encoding one or more of the subsets 402a-402c using any hashing or encryption method;
determining a type of arguments (e.g., integer, string);
padding the data in one or more of subsets 402a-402c with random data of the same type (as can be seen in FIG. 4B). The type, size, and placing of the padding data may be selected randomly by JSA 146, e.g., by chaotic engine 146.

FIG. 4B describes the padding process of the data, in subsets 402a-402c, with random data of the same type. Such padding is performed only after determining a type of arguments (e.g., integer, string). Thus, for example, in subset 402a, the string 00 may be inserted. Similarly, in subset 402b, the strings 0 and 00 may be inserted, and in subset 402c, the strings 00 and 00 may be inserted.

Figure 4C:
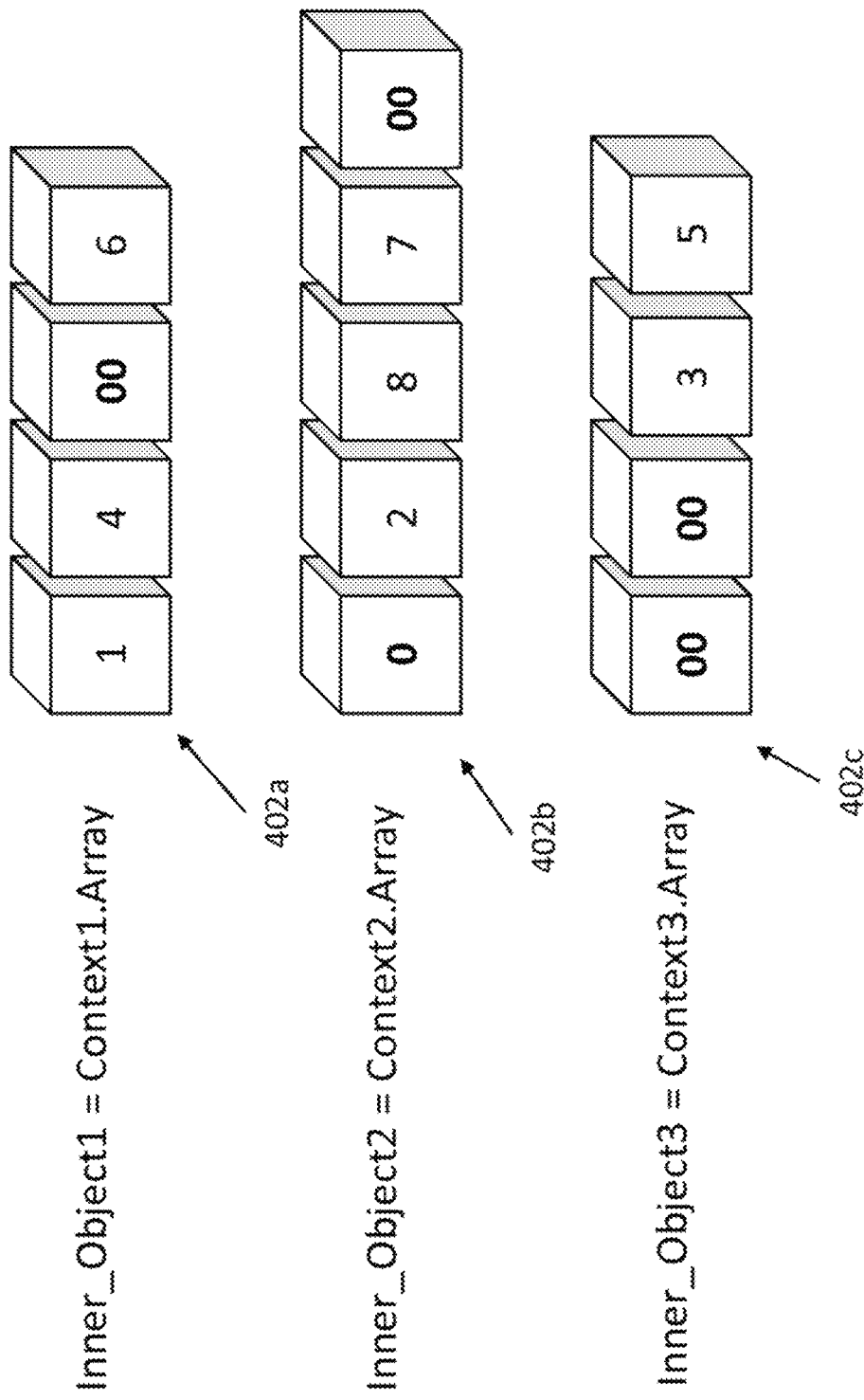

FIG. 4C describes generating separate execution contexts for each of the split subsets 402a-402e. With reference to FIG. 4C, in some embodiments, in the case of array objects, the software agent may create a new array based on each subset 402a-402c in each execution context. Thus, the chaotic execution environment results in creating 3 arrays (Context1.Array, Context2.Array, and Context3.Array), each in a separate context.

In some embodiments, in the case of a web browser, JSA 146, e.g., chaotic engine 146e, may generate different inline frames (IFrames) for different contexts. An execution context may be understood as a wrapper object, which holds key details for processing a given method, such as variable object, window object, event queue, scope chain, etc. Forcing a web browser to create new iframes generates a new execution context for each split subset 402a-402c.

With reference back to FIG. 3, in some embodiments, in step 310, the program instruction of system 100 may cause JSA 146 to generate and store a mapping 146d of the associations between subsets 402a-402c and the different memory locations and execution contexts. Mapping 146d may be generated and stored to map between the original and manipulated objects. For example, in FIG. 2, such mapping 146d may be generated and stored by chaotic engine 146e at controller 146b. In some embodiments, the mapping includes a location of each of the subsets of arguments within the multiple arrays. In some embodiments, the mapping stores information with respect to any chaotic execution actions and/or manipulations performed with respect to an intercepted API, e.g., splitting, encoding, padding, and diverting.

For example, with reference to FIG. 4C, an exemplary location mapping 146d may comprise the following elements:

The location of the argument with index 0 (value=1) created in array 402 in FIG. 4A may be designated as argument index 0 within Inner_Object1:
simpleArray[0]→(Inner_Object1 [0])

The location of the argument with index 4 (value=5) created in array 402 may be designated as argument index 3 within Inner_Object3:
simpleArray[4]→(Inner_Object3[3])

FIG. 4D shows an exemplary mapping 146d according to an example embodiment. The exemplary mapping 146d in FIG. 4D may be used in step 312, detailed below, to return the expected values of read operations, wherein expected values may be returned with respect to read/write operations using mapping 146d, so that legitimate code may execute as intended. Thus, for example, any API call to read data from the supposedly-created array 402 at index 4 will be intercepted by JSA 146, which retrieves the relevant value using the exemplary mapping 146d. However, the actual simple array 402 does not exist, thus any attempt to use it by the malicious code is frustrated.

In some embodiments, mapping 146d is configured to maintain functionality of the execution environment, in view of the various chaotic manipulation applied to the executed code. For example, for each patched function, mapping 146d may store in a key-value map the patched function as the key, and the original native as the value. Thus, mapping 146d can enable to efficiently locate the native implementation based on the patching, and return the expected values for operations on the patched function. For example:

The function someFunc.toString( ) should return the string representation of a function, and in the case of a native function, it will return "function Array( ) { [native code] }" (for Array native).

The function someFunc.length indicates the number of parameters expected by the function.

The function someFunc.name indicates the function's name as specified when it was created.

With reference back to FIG. 3, in some embodiments, in step 312, the expected values with respect to read/write operations are returned to the original invocation, using the mapping. Thus, legitimate code is executed as intended, while any code that relies on the predictable behavior of the underlying memory fails to fulfill its malicious intent.

In some embodiments, a proxy object may be generated and returned to the invocation, so that a simple array variable holds this array, and all read operations are intercepted by the proxy object, which uses the mapping to retrieve the proper value, decode it, and return to the original invocation. The proxy object described here is an example of proxy object 146c in FIG. 2. For example, with reference to FIG. 2, proxy object 146c may be created by chaotic engine 146e, and proxy object 146c may be linked to mapping 146d.

Figure 7:
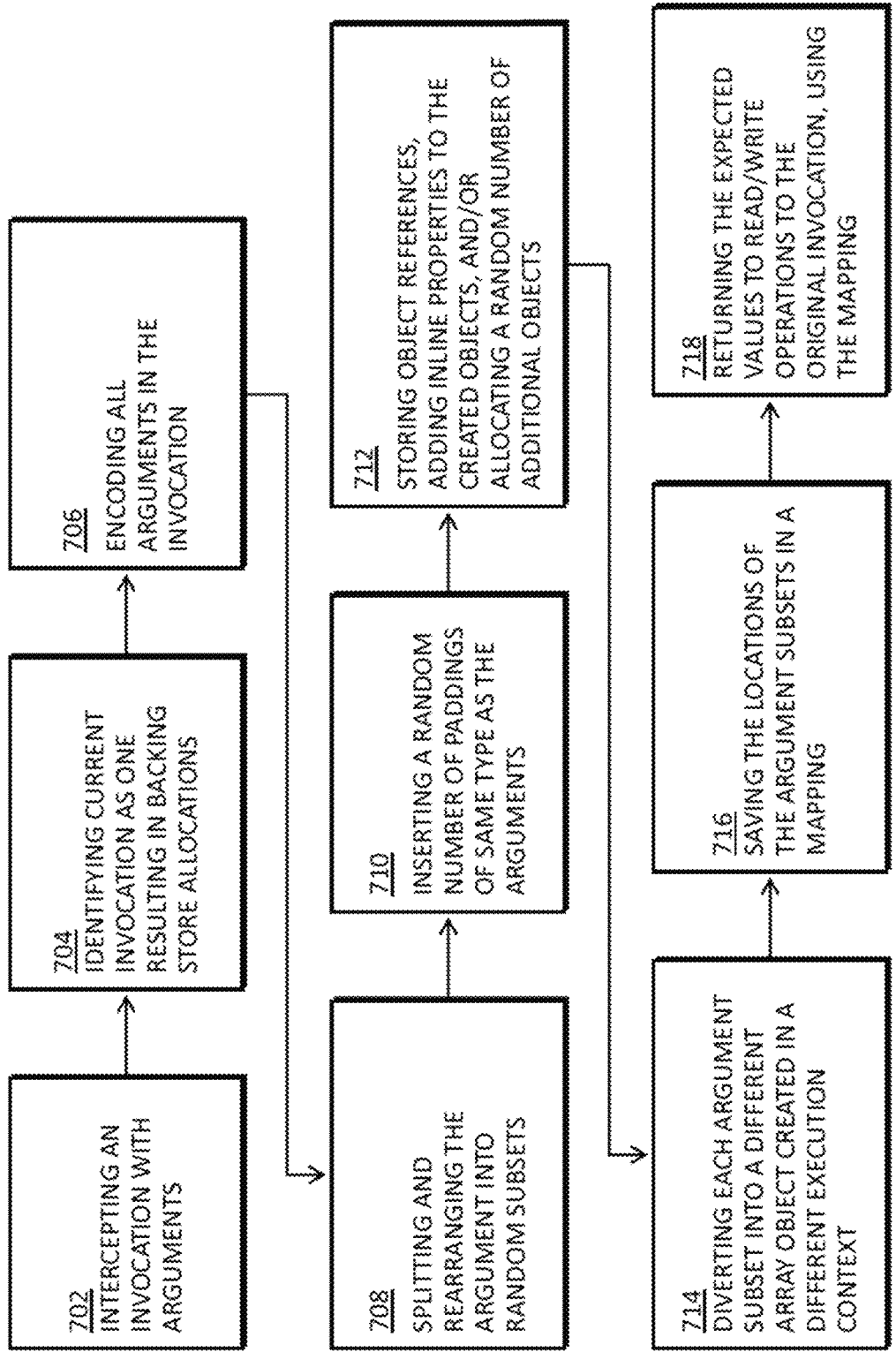
FIG. 7 depicts a flowchart of an example method for manipulating input data and splitting context, in accordance with some embodiments of the present disclosure.

The program instructions of JSA 146, shown in FIGS. 1 and 2, including its modules patcher 146a, controller 146b, proxy object 146c, mapping 146d and chaotic engine 146e, will now be discussed with reference to the flowchart of FIG. 7, which illustrates the functional steps in a method for manipulating input data and splitting context in accordance with some embodiments of the present disclosure.

In some embodiments, in step 702, when an API invocation for simpleArray creation is intercepted, such interception may be performed by wrapped API 222 in FIG. 2, and is related to step 304 of FIG. 3.

In step 704, the invocation is identified as altering, i.e., results in backing store allocation, such identification may be performed by controller module 146b of FIG. 2 and is related to step 306 of FIG. 3.

In step 706, the arguments of the invocations are encoded.

In step 708, the arguments are split and rearranged into a few groups, such split may be performed by chaotic engine 146e in FIG. 2, and is related to step 308 of FIG. 3, and to subsets 402a-402c of FIG. 4A.

In step 710, arguments type is checked, and random padding of the same type is inserted between each argument, such padding may be performed by chaotic engine 146e of FIG. 2, and relates to step 308 of FIG. 3 and to FIG. 4B.

In step 712, object references may be stored by JSA 146, such that the reference to that object will not be freed and the garbage collector will not collect it. In some embodiments, JSA 146 may also add inline properties to the created object, for example, by adding a random number of properties containing primitive values, and setting them as non-enumerable with a Symbol as the property key.

In step 714, each argument group may be diverted into different array objects generated in different contexts. Such diversion to different contexts may be performed by chaotic engine 146e of FIG. 2, and relates to step 308 of FIG. 3 and to FIG. 4C.

In step 716, the new argument location (index and array object) may be stored in a mapping 146d, such mapping may be performed by chaotic engine 146e in FIG. 2, and is an example of mapping 146d of FIG. 2, and an example of the mapping of FIG. 4D.

Finally, in step 718, the expected values with respect to read/write operations are returned to the original invocation, using the mapping. Thus, legitimate code is executed as intended, while any code that relies on the predictable behavior of the underlying memory fails to fulfill its malicious intent.

In some embodiments, a proxy object may be generated and returned to the invocation, so that a simple array variable holds this array, and all read operations are intercepted by the proxy object, which uses the mapping to retrieve the proper value, decode it, and return to the original invocation. The proxy object described here is an example of proxy object 146c in FIG. 2, and described in step 312 of FIG. 3.

The present invention may be a computer system, a computer-implemented method, and or a computer program product. The computer program product may include a computer readable storage medium (or media) having computer readable program instructions thereon for causing a hardware processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a Static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PLA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and or block diagrams, can be implemented by computer readable program instructions.

These computer readable program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A cyber security system, comprising:
   at least one processor configured to:
   receive, by an application capable of JavaScript execution, code executable by a web browser;
   execute, before execution of the received code executable by the web browser, an intercepting code, wherein the intercepting code is configured to intercept at least one application programming interface (API) invocation by the received code executable by the web browser;
   intercept, by the intercepting code, an API invocation by the received code executable by the web browser;
   determine that the intercepted API invocation results in a manipulation of a first backing store object in browser process memory; and
   modify an execution of the intercepted API invocation, wherein the modified execution of the intercepted API invocation results in at least one of: a non-predictable memory layout, a non-predictable memory behavior, or a non-predictable property of the first backing store object or a second backing store object.

2. The cyber security system of claim 1, wherein modifying the execution of the intercepted API invocation includes at least one of:
   encoding in input data associated with the API invocation, at least some randomly selected arguments;
   dividing into a random number of execution contexts, input data associated with the API invocation;
   splitting into a random number of subsets, input data associated with the API invocation;
   padding with random data of a same type as the argument, at least some randomly selected arguments in input data associated with the API invocation;
   adding a random number of inline properties to input data associated with the API invocation;
   allocating within memory a random number of additional backing store objects; or
   holding at least one object reference in memory in a manner preventing collection by a garbage collector, and releasing the at least one held object for garbage collection upon an occurrence of a specified condition.

3. The cyber security system of claim 1, wherein intercepting the API invocation includes creating a new JavaScript object, and wherein modifying the execution of the intercepted API invocation includes dividing input data associated with the API invocation into a random number of execution contexts by splitting the input data into a random number of subsets, and creating, for the subsets, separate objects within at least one of the execution contexts.

4. The cyber security system of claim 1, wherein intercepting the API invocation includes creating a new array object, and wherein modifying the execution of the intercepted API invocation includes dividing input data associated with the API invocation into a random number of execution contexts, the input data including arguments associated with the new array object, and the dividing including splitting the input data into a random number of subsets, and creating, for the subsets, separate array objects within at least one of the execution contexts.

5. The cyber security system of claim 1, wherein modifying the execution of the intercepted API invocation includes dividing input data associated with the API invocation into a random number of execution contexts, the input data having at least one argument, and wherein the at least one processor is further configured to store a mapping of the modified execution, the mapping including a location, within the execution contexts, of the at least one argument.

6. The cyber security system of claim 5, wherein the at least one processor is further configured to use the mapping to respond to at least one of a read operation by the intercepted API or a write operation by the intercepted API.

7. The cyber security system of claim 1, wherein the API invocation is associated with a native API and is patched prior to interception.

8. The cyber security system of claim 1, wherein the intercepting of the API invocation occurs during runtime of the received code executable by the web browser.

9. The cyber security system of claim 8, wherein at least one of the first backing store object or the second backing store object is stored in memory.

10. The cyber security system of claim 1, wherein the at least one API invocation includes at least one JavaScript native API invoked by JavaScript code.

11. The cyber security system of claim 1, wherein the execution of the intercepted API invocation is modified during runtime.

12. The cyber security system of claim 1, wherein the application capable of JavaScript execution is a browser.

13. A computer-implemented method for cyber security, the method comprising:
  receiving, by an application capable of JavaScript execution, code executable by a web browser;
  executing, before execution of the received code executable by the web browser, an intercepting code, wherein the intercepting code is configured to intercept at least one application programming interface (API) invocation by the received code executable by the web browser;
  intercepting, by the intercepting code, an API invocation by the received code executable by the web browser;
  determining that the intercepted API invocation results in a manipulation of a first backing store object in browser process memory; and
  modifying an execution of the intercepted API invocation, wherein the modified execution of the intercepted API invocation results in at least one of: a non-predictable memory layout, a non-predictable memory behavior, or a non-predictable property of the first backing store object or a second backing store object.

14. The computer-implemented method of claim 13, wherein modifying the execution of the intercepted API invocation includes at least one of:
  encoding in input data associated with the API invocation, at least some randomly selected arguments;
  dividing into a random number of execution contexts, input data associated with the API invocation;
  splitting into a random number of subsets, input data associated with the API invocation;
  padding with random data of a same type as the argument, at least some randomly selected arguments in input data associated with the API invocation;
  adding a random number of inline properties to input data associated with the API invocation;
  allocating within memory a random number of additional backing store objects; or
  holding at least one object reference in memory in a manner preventing collection by a garbage collector, and releasing the at least one held object for garbage collection upon an occurrence of a specified condition.

15. The computer-implemented method of claim 13, wherein intercepting the API invocation includes creating a new JavaScript object, and wherein modifying the execution of the intercepted API invocation includes dividing input data associated with the API invocation into a random number of execution contexts by splitting the input data into a random number of subsets, and creating, for the subsets, separate objects within at least one of the execution contexts.

16. The computer-implemented method of claim 13, wherein intercepting the API invocation includes creating a new array object, and wherein modifying the execution of the intercepted API invocation includes dividing input data associated with the API invocation into a random number of execution contexts, the input data including arguments associated with the new array object, and the dividing including splitting the input data into a random number of subsets, and creating, for the subsets, separate array objects within at least one of the execution contexts.

17. The computer-implemented method of claim 13, wherein modifying the execution of the intercepted API invocation includes dividing input data associated with the API invocation into a random number of execution contexts, the input data having at least one argument, and wherein the method further comprises storing a mapping of the modified execution, the mapping including a location, within the execution contexts, of the at least one argument.

18. The computer-implemented method of claim 17, further comprising using the mapping to respond to at least one of a read operation by the intercepted API or a write operation by the intercepted API.

19. The computer-implemented method of claim 18, wherein using the mapping to respond includes using a proxy object.

20. The computer-implemented method of claim 13, wherein the API invocation is associated with a native API and is patched prior to interception.

21. The computer-implemented method of claim 13, wherein the intercepting of the API invocation occurs during runtime of the received code executable by the web browser.

22. The computer-implemented method of claim 21, wherein at least one of the first backing store object or the second backing store object is stored in memory.

23. The computer-implemented method of claim 13, wherein the at least one API invocation includes at least one JavaScript native API invoked by JavaScript code.

24. The computer-implemented method of claim 13, wherein the execution of the intercepted API invocation is modified during runtime.

25. The computer-implemented method of claim 13, wherein the application capable of JavaScript execution is a browser.

26. A non-transitory computer-readable medium storing program instructions executable by at least one processor to:
  receive, by an application capable of JavaScript execution, code executable by a web browser;
  execute, before execution of the received code executable by the web browser, an intercepting code, wherein the intercepting code is configured to intercept at least one application programming interface (API) invocation by the received code executable by the web browser;
  intercept, by the intercepting code, an API invocation by the received code executable by the web browser;
  determine that the intercepted API invocation results in a manipulation of a first backing store object in browser process memory; and
  modify an execution of the intercepted API invocation, wherein the modified execution of the intercepted API invocation results in at least one of: a non-predictable memory layout, a non-predictable memory behavior, or a non-predictable property of the first backing store object or a second backing store object.

27. The non-transitory computer-readable medium of claim 26, wherein modifying the execution of the intercepted API invocation includes at least one of:
  encoding in input data associated with the API invocation, at least some randomly selected arguments;
  dividing into a random number of execution contexts, input data associated with the API invocation;
  splitting into a random number of subsets, input data associated with the API invocation;
  padding with random data of a same type as the argument, at least some randomly selected arguments in input data associated with the API invocation;
  adding a random number of inline properties to input data associated with the API invocation;
  allocating within memory a random number of additional backing store objects; or
  holding at least one object reference in memory in a manner preventing collection by a garbage collector, and releasing the at least one held object for garbage collection upon an occurrence of a specified condition.

28. The non-transitory computer-readable medium of claim 26, wherein intercepting the API invocation includes creating a new JavaScript object, and wherein modifying the execution of the intercepted API invocation includes dividing input data associated with the API invocation into a random number of execution contexts by splitting the input data into a random number of subsets, and creating, for the subsets, separate objects within at least one of the execution contexts.

29. The non-transitory computer-readable medium of claim 26, wherein intercepting the API invocation includes creating a new array object, and wherein modifying the execution of the intercepted API invocation includes dividing input data associated with the API invocation into a random number of execution contexts, the input data including arguments associated with the new array object, and the dividing including splitting the input data into a random number of subsets, and creating, for the subsets, separate array objects within at least one of the execution contexts.

30. The non-transitory computer-readable medium of claim 26, wherein modifying the execution of the intercepted API invocation includes dividing input data associated with the API invocation into a random number of execution contexts, the input data having at least one argument, and wherein the program instructions are further executable by the at least one processor to store a mapping of the modified execution, the mapping including a location, within the execution contexts, of the at least one argument.

31. The non-transitory computer-readable medium of claim 30, wherein the program instructions are further executable by the at least one processor to use the mapping to respond to at least one of a read operation by the intercepted API or a write operation by the intercepted API.

32. The non-transitory computer-readable medium of claim 31, wherein using the mapping to respond includes using a proxy object.

33. The non-transitory computer-readable medium of claim 26, wherein the API invocation is associated with a native API and is patched prior to interception.

34. The non-transitory computer-readable medium of claim 26, wherein the intercepting of the API invocation occurs during runtime of the received code executable by the web browser.

35. The non-transitory computer-readable medium of claim 34, wherein at least one of the first backing store object or the second backing store object is stored in memory.

36. The non-transitory computer-readable medium of claim 26, wherein the at least one API invocation includes at least one JavaScript native API invoked by JavaScript code.

37. The non-transitory computer-readable medium of claim 26, wherein the execution of the intercepted API invocation is modified during runtime.

38. The non-transitory computer-readable medium of claim 26, wherein the application capable of JavaScript execution is a browser.

39. A cyber security system comprising:
at least one processor configured to:
receive, by an application capable of JavaScript execution, code executable by a web browser in a JavaScript execution environment;
execute, before execution of the received code executable by the web browser in a JavaScript execution environment, an intercepting code, wherein the intercepting code is configured to intercept at least one application programming interface (API) invocation by the received code executable by the web browser in a JavaScript execution environment;
intercept, by the intercepting code, an API invocation by the received code executable by the web browser in a JavaScript execution environment;
determine that the intercepted API invocation results in a manipulation of a first backing store object in browser process memory; and
modify an execution of the intercepted API invocation, wherein the modified execution of the intercepted API invocation results in at least one of: a non-predictable memory layout, a non-predictable memory behavior, or a non-predictable property of the first backing store object or a second backing store object.

40. A computer-implemented method for cyber security, the method comprising:
receiving, by an application capable of JavaScript execution, code executable by a web browser in a JavaScript execution environment;
executing, before execution of the received code executable by the web browser in a JavaScript execution environment, an intercepting code, wherein the intercepting code is configured to intercept at least one application programming interface (API) invocation by the received code executable by the web browser in a JavaScript execution environment;
intercepting, by the intercepting code, an API invocation by the received code executable by the web browser in a JavaScript execution environment;
determining that the intercepted API invocation results in a manipulation of a first backing store object in browser process memory; and
modifying an execution of the intercepted API invocation, wherein the modified execution of the intercepted API invocation results in at least one of: a non-predictable memory layout, a non-predictable memory behavior, or a non-predictable property of the first backing store object or a second backing store object.

41. A non-transitory computer-readable medium storing program instructions executable by at least one processor to:
receive, by an application capable of JavaScript execution, code executable by a web browser in a JavaScript execution environment;
execute, before execution of the received code executable by the web browser in a JavaScript execution environment, an intercepting code, wherein the intercepting code is configured to intercept at least one application programming interface (API) invocation by the received code executable by the web browser in a JavaScript execution environment;
intercept, by the intercepting code, an API invocation by the received code executable by the web browser in a JavaScript execution environment;
determine that the intercepted API invocation results in a manipulation of a first backing store object in browser process memory; and
modify an execution of the intercepted API invocation, wherein the modified execution of the intercepted API invocation results in at least one of: a non-predictable memory layout, a non-predictable memory behavior, or a non-predictable property of the first backing store object or a second backing store object.

* * * * *